United States Patent
Mutsuo

(10) Patent No.: US 10,560,596 B2
(45) Date of Patent: Feb. 11, 2020

(54) IMAGE FORMING APPARATUS

(71) Applicant: KYOCERA Document Solutions Inc., Osaka (JP)

(72) Inventor: Toshiaki Mutsuo, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/109,932

(22) Filed: Aug. 23, 2018

(65) Prior Publication Data

US 2019/0068821 A1 Feb. 28, 2019

(30) Foreign Application Priority Data

Aug. 24, 2017 (JP) .................. 2017-161670

(51) Int. Cl.
*G06F 15/00* (2006.01)
*H04N 1/04* (2006.01)

(52) U.S. Cl.
CPC ........... *H04N 1/0408* (2013.01); *H04N 1/042* (2013.01)

(58) Field of Classification Search
CPC .............................. H04N 1/0408; H04N 1/042
USPC ........................................................ 358/1.2
See application file for complete search history.

(56) References Cited

U.S. PATENT DOCUMENTS 5,341,466 A * 8/1994 Perlin .................. G06T 3/0025
345/428

FOREIGN PATENT DOCUMENTS

JP 2011-224884 11/2011

* cited by examiner

*Primary Examiner* — Mark R Milia

(57) ABSTRACT

An image forming apparatus includes a printing device, an output value converting unit, and a controller. The output value converting unit is configured to (a) change pixel values of pixels alternatively determined in a primary scanning direction and a secondary scanning direction so as to delete a dot on the pixels in a solid part in a target image and (b) change pixel values of pixels that are alternatively not determined in the primary scanning direction and the secondary scanning direction so as to gain a dot size of the pixels in the solid part. The controller is configured to control the printing device so as to print the solid part with dot sizes corresponding to the pixel values.

5 Claims, 12 Drawing Sheets

FIG. 3A

DOT DELETION PATTERN

|   |   |   |
|---|---|---|
|   | 2 |   |
| 2 | 2 | 2 |
|   | 2 |   |
|   |   |   |

TARGET PIXEL

FIG. 3B

DOT SIZE GAIN PATTERN

|   |   |   |
|---|---|---|
|   | 2 |   |
| 2 | 2 | 2 |
| 2 | 2 | 2 |
| 2 | 2 | 2 |
|   | 2 |   |

TARGET PIXEL

FIG. 4A

DOT DELETION PATTERN

|   | 2 |   |
|---|---|---|
| 2 | 2 | 2 |
| 2 | 2 | 2 |
| 2 | 2 | 2 |
|   | 2 |   |

— TARGET PIXEL

FIG. 4B

DOT SIZE GAIN PATTERN

|   |   |   |
|---|---|---|
|   | 2 |   |
| 2 | 2 | 2 |
|   | 2 |   |
|   |   |   |

— TARGET PIXEL

FIG. 6A

| 2 | 2 | 2 | 2 | 2 | 2 |
|---|---|---|---|---|---|
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 1 |
| 2 | 2 | 2 | 2 | 2 | 1 |
| 2 | 2 | 2 | 2 | 2 | 1 |
| 1 | 2 | 2 | 2 | 2 | 1 |
|   |   | 1 | 2 | 2 |   |
|   |   |   |   | 1 |   |

FIG. 6B

| 2 | 2 | 2 | 2 | 2 | 2 |
|---|---|---|---|---|---|
| 2 | 0 | 2 | 0 | 2 | 2 |
| 0 | 3 | 0 | 3 | 0 | 2 |
| 3 | 0 | 3 | 0 | 3 | 2 |
| 0 | 3 | 0 | 3 | 0 | 2 |
| 3 | 0 | 3 | 0 | 3 | 2 |
| 0 | 3 | 0 | 3 | 0 | 2 |
| 3 | 0 | 3 | 0 | 3 | 1 |
| 0 | 3 | 0 | 3 | 0 | 1 |
| 2 | 0 | 2 | 0 | 2 | 1 |
| 1 | 2 | 2 | 2 | 2 | 1 |
|   |   | 1 | 2 | 2 |   |
|   |   |   |   | 1 |   |

FIG. 9
SIZE OF ONE PIXEL
IN THE ORIGINAL RESOLUTION
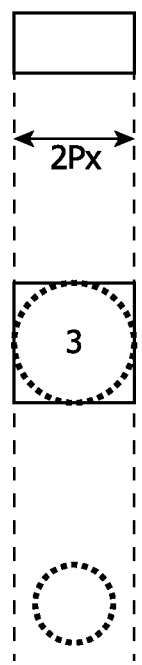
SIZE OF ONE PIXEL
AFTER RESOLUTION CONVERSION
DOT SIZE WHEN GRADATION LEVEL VALUE = 3
FOR PLAIN PAPER SHEET
DOT SIZE WHEN GRADATION LEVEL VALUE = 2
FOR PLAIN PAPER SHEET

FIG. 10A

| 2 | 2 | 2 | 2 | 2 | 2 |
|---|---|---|---|---|---|
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 2 |
| 2 | 2 | 2 | 2 | 2 | 1 |
| 2 | 2 | 2 | 2 | 2 | 1 |
| 2 | 2 | 2 | 2 | 2 | 1 |
| 1 | 2 | 2 | 2 | 2 | 1 |
|   |   | 1 | 2 | 2 |   |
|   |   |   |   | 1 |   |

FIG. 10B

| 2 | 2 | 2 | 2 | 2 | 2 |
|---|---|---|---|---|---|
| 3 | 2 | 3 | 2 | 3 | 2 |
| 0 | 3 | 0 | 3 | 0 | 2 |
| 3 | 0 | 3 | 0 | 3 | 2 |
| 0 | 3 | 0 | 3 | 0 | 2 |
| 3 | 0 | 3 | 0 | 3 | 2 |
| 0 | 3 | 0 | 3 | 2 | 2 |
| 3 | 0 | 3 | 0 | 2 | 1 |
| 2 | 3 | 0 | 3 | 2 | 1 |
| 2 | 2 | 3 | 0 | 2 | 1 |
| 1 | 2 | 2 | 3 | 2 | 1 |
|   |   | 1 | 2 | 2 |   |
|   |   |   |   | 1 |   |

IMAGE FORMING APPARATUS

CROSS-REFERENCE TO RELATED APPLICATIONS

This application relates to and claims priority rights from Japanese Patent Application No. 2017-161670, filed on Aug. 24, 2017, the entire disclosures of which are hereby incorporated by reference herein.

BACKGROUND

1. Field of the Present Disclosure

The present disclosure relates to an image forming apparatus.

2. Description of the Related Art

An inkjet image forming apparatus deletes dots at alternate pixel positions in a solid part and thereby restrains banding.

However, when the dots are deleted by a constant ratio, some droplet sizes (dot sizes) may cause a low density of the solid part.

SUMMARY

An image forming apparatus includes a printing device, an output value converting unit, and a controller. The output value converting unit is configured to (a) change pixel values of pixels alternatively determined in a primary scanning direction and a secondary scanning direction so as to delete a dot on the pixels in a solid part in a target image and (b) change pixel values of pixels that are alternatively not determined in the primary scanning direction and the secondary scanning direction so as to gain a dot size of the pixels in the solid part. The controller is configured to control the printing device so as to print the solid part with dot sizes corresponding to the pixel values.

These and other objects, features and advantages of the present disclosure will become more apparent upon reading of the following detailed description along with the accompanied drawings.

BRIEF DESCRIPTION OF THE DRAWINGS

FIGS. 3A and 3B show diagrams that indicate an example of patterns used for an inkjet specific paper sheet by an output value converting unit 13 shown in FIG. 1;

FIGS. 4A and 4B show diagrams that indicate an example of patterns used for a plain paper sheet by an output value converting unit 13 shown in FIG. 1;

FIGS. 6A and 6B show diagrams that indicate an example of conversion of a pixel value in a solid part performed by an output value converting unit 13 shown in FIG. 1 for an inkjet specific paper sheet;

FIG. 9 shows a diagram that explains a dot size for a plain paper sheet;

FIGS. 10A and 10B show diagrams that indicate an example of conversion of a pixel value in a solid part performed by an output value converting unit 13 shown in FIG. 1 for a plain paper sheet;

DETAILED DESCRIPTION

Hereinafter, an embodiment according to an aspect of the present disclosure will be explained with reference to drawings.

Figure 1:
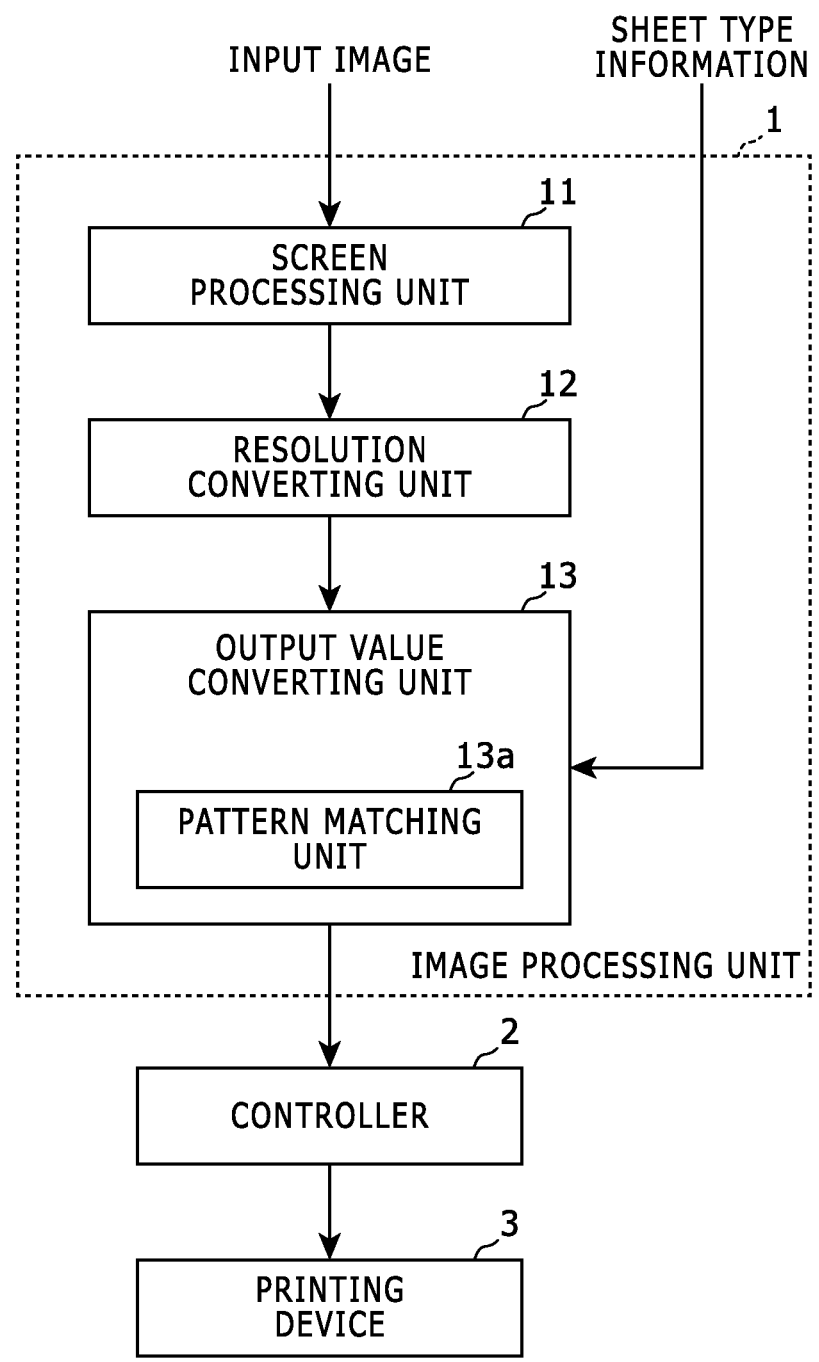
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is a printer, a multi function peripheral or the like of an inkjet type or an electrophotographic type, and includes an image processing unit 1, a controller 2, and a printing device 3.

The image processing unit 1 performs image processing for an input image, and thereby generates an image for printing. The image processing unit 1 includes a screen processing unit 11, a resolution converting unit 12, and an output value converting unit 13.

The screen processing unit 11 performs a screen process for the input image. Consequently, without changing a resolution, a binary image is generated, for example, from an input image with 256 gradation levels.

The resolution converting unit 12 performs a resolution conversion process for the image obtained by the screen process, and thereby makes a primary scanning directional resolution and a secondary scanning direction resolution of the image be identical to printing resolutions of the printing device 3. Here, the primary scanning directional resolution and the secondary scanning direction resolution of the input image are identical to each other, and one of the primary scanning directional resolution and the secondary scanning direction resolution of the input image is converted to a half of the original resolution. For example, the original resolutions in the primary and secondary scanning directions are 1200 dpi, and then a sum or an average value of pixel values of two pixels adjacent to each other are set to a pixel value of one converted pixel corresponding to the two pixels and thereby the resolution in the primary scanning direction is converted to 600 dpi. Consequently, an image after the resolution conversion process is a three tone level image.

The output value converting unit 13 (*a*) changes pixel values of pixels alternatively determined in a primary scanning direction and a secondary scanning direction so as to delete a dot on the pixels in a solid part in a target image (here, an image after the aforementioned screen process and the aforementioned resolution conversion process) and (b) changes pixel values of pixels that are alternatively not determined in the primary scanning direction and the secondary scanning direction so as to gain a dot size of the pixels in the solid part. The solid part means an area that uniformly has a single maximum density. For example, if the target image is a three tone level image and its pixel value falls into 0, 1 or 2, then the solid part is an area that includes spatially continuous pixels with a single pixel value of 2.

Figure 2:
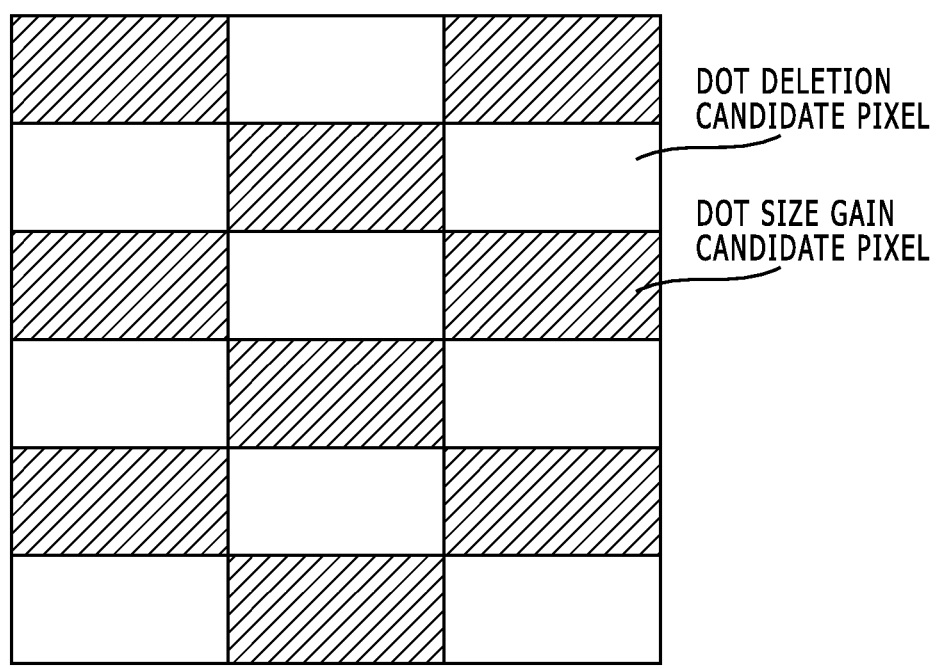
FIG. 2 shows a diagram that explains a dot deletion candidate pixel and a dot size gain candidate pixel in a solid part.

FIG. 2 shows a diagram that explains a dot deletion candidate pixel and a dot size gain candidate pixel in a solid part. As shown in FIG. 2, dot deletion candidate pixels (blank pixels in FIG. 2) and dot size gain candidate pixels (hatched pixels in FIG. 2) are determined on the basis of pixel coordinate values thereof so that the dot deletion candidate pixels and the dot size gain candidate pixels are alternately arranged. For example, in accordance with a value of an exclusive disjunction (XOR) for a least significant bit of a coordinate value in the primary scanning direction and a least significant bit of a coordinate value in the secondary scanning direction, each pixel is classified as a dot deletion candidate pixel or a dot size gain candidate pixel.

In this embodiment, the output value converting unit 13 includes a pattern matching unit 13a, and using the pattern matching unit 13a, determines the pixels on which the dots are deleted and the pixels of which the dot sizes are gained by performing the pattern matching. A pattern in the pattern matching is formed so that the pixels on which the dots are deleted and the pixels of which the dot sizes are gained must be included in a solid part. Specifically, if a pixel of which surrounding pixels have pixel values that agree with a specific pattern in the pattern matching is a dot deletion candidate pixel, then this dot deletion candidate pixel is determined as a pixel on which a dot is deleted; and the other pixels are not determined as a pixel on which a dot is deleted. In addition, if a pixel of which surrounding pixels have pixel values that agree with a specific pattern in the pattern matching is a dot size gain candidate pixel, then this dot size gain candidate pixel is determined as a pixel of which a dot size is gained; and the other pixels are not determined as a pixel of which a dot size is gained.

Further, in this embodiment, the output value converting unit 13 changes a ratio between the pixels on which the dots are deleted and the pixels of which the dot sizes are gained in an edge part of the solid part in accordance with a sheet type of a printing paper sheet. Here, the output value converting unit 13 changes the pattern in the pattern matching in accordance with the sheet type, and thereby, changes a ratio between the pixels on which the dots are deleted and the pixels of which the dot sizes are gained in an edge part of the solid part.

FIGS. 4A and 4B show diagrams that indicate an example of patterns used for a plain paper sheet by an output value converting unit 13 shown in FIG. 1. FIG. 4A indicates a pattern to determine a pixel on which a dot is deleted and FIG. 4B indicates a pattern to determine a pixel of which a dot size is gained.

FIGS. 3A and 3B show diagrams that indicate an example of patterns used for an inkjet specific paper sheet by an output value converting unit 13 shown in FIG. 1. FIG. 3A indicates a pattern to determine a pixel on which a dot is deleted and FIG. 3B indicates a pattern to determine a pixel of which a dot size is gained. An inkjet specific paper sheet produces less ink blur than one on a plain paper sheet. Therefore, in comparison with a droplet for a plain paper sheet, a large droplet is used for an inkjet specific paper sheet in order to make a large dot.

The output value converting unit 13 moves a target pixel pixel by pixel along the scanning directions in a target image, and determines whether the patterns shown in FIG. 3A or 4A and pixel values in the target image agree with each other or not. When the both agree with each other, if the target pixel is a dot deletion candidate pixel, then the output value converting unit 13 changes a pixel value of the target pixel to 0.

Similarly, the output value converting unit 13 moves a target pixel pixel by pixel along the scanning directions in a target image, and determines whether the patterns shown in FIG. 3B or 4B and pixel values in the target image agree with each other or not. When the both agree with each other, if the target pixel is a dot size gain candidate pixel, then the output value converting unit 13 changes a pixel value of the target pixel to 3.

The patterns shown in FIGS. 3A and 3B and FIGS. 4A and 4B are applied to an image that a resolution in the primary scanning direction was converted to be a half and a pixel value of each pixel was set as a sum of pixel values of the two pixels adjacent to each other (i.e. an image of which each pixel value is 0, 1 or 2), as mentioned.

As shown in FIGS. 3A and 3B and FIGS. 4A and 4B, in an edge part of a solid part, pixels on which dots are deleted are determined with the pattern shown FIG. 3A more than ones determined with the pattern shown FIG. 4A because the pattern shown in FIG. 3A has a smaller size than a size of the pattern shown in FIG. 4A. Further, in an edge part of a solid part, pixels of which dot sizes are gained are determined with the pattern shown FIG. 3B less than ones determined with the pattern shown FIG. 4B because the pattern shown in FIG. 3B has a larger size than a size of the pattern shown in FIG. 4B.

Here, resolutions in the primary and the secondary scanning directions are different from each other, and the output value converting unit 13 gains a dot size of an undeleted dot to a specific dot size. This specific dot size is a dot size in a case assuming that the both resolutions in the primary and secondary scanning directions would be identical to a lower resolution in one of the primary and secondary scanning directions than a resolution in the other of the primary and secondary scanning directions. For example, if a resolution in the primary scanning direction is 600 dpi and a resolution in the secondary scanning direction is 1200 dpi, then applied is a dot size (a dot diameter of a circle shaped dot) assuming the both resolutions in the primary and secondary scanning directions would be 600 dpi.

Further, the image processing unit 1 includes an ASIC (Application Specific Integrated Circuit) or a computer that includes a CPU (Central Processing Unit), a ROM (Read Only Memory), and a RAM (Random Access Memory), loads a program stored in the ROM or the like to the RAM and executes the program with the CPU or activates the ASIC, and thereby acts as the aforementioned processing units.

The controller 2 includes an ASIC, for example, and controls the printing device 3. The printing device 3 prints an image processed by the image processing unit 1 on a printing paper sheet in an electrophotographic manner or in an inkjet manner. The controller 2 controls the printing device 3 so as to cause the printing device 3 to print a solid part with a dot size corresponding to the aforementioned pixel value.

In the inkjet manner, one droplet is ejected for one dot. If one independent dot is formed with one droplet, the dot has a circular shape. A droplet with a liquid ink amount corresponding to a pixel value is ejected and thereby a dot corresponding to the pixel value is formed.

In the electrophotographic manner, for one dot, a photoconductor drum is irradiated with laser light and thereby a circular electrostatic latent image is formed, and developed with toner, and thereafter a circular toner image is transferred directly or indirectly to a paper sheet. Consequently, the dot has a circular shape.

The following part explains a behavior of the aforementioned image forming apparatus.

When an input image and sheet type information are inputted to the image processing unit 1, at first, the screen processing unit 11 performs a screen process for the input image. Consequently, a binary image is generated. The input image and the sheet type information are specified by a user.

Subsequently, the resolution converting unit 12 performs a resolution conversion process for the binary image in the aforementioned manner, and here thereby generates a three tone level image.

Subsequently, the output converting unit 13 determines dot deletion candidate pixels and dot size gain candidate pixels on the basis of pixel coordinate values in the aforementioned manner, and sets, as 0, pixel values of the dot deletion candidate pixels in a solid part that are determined by the pattern matching, and sets, as 3, pixel values of the dot size gain candidate pixels in a solid part that are determined by the pattern matching, and thereby generates a four tone level image.

Figure 5:
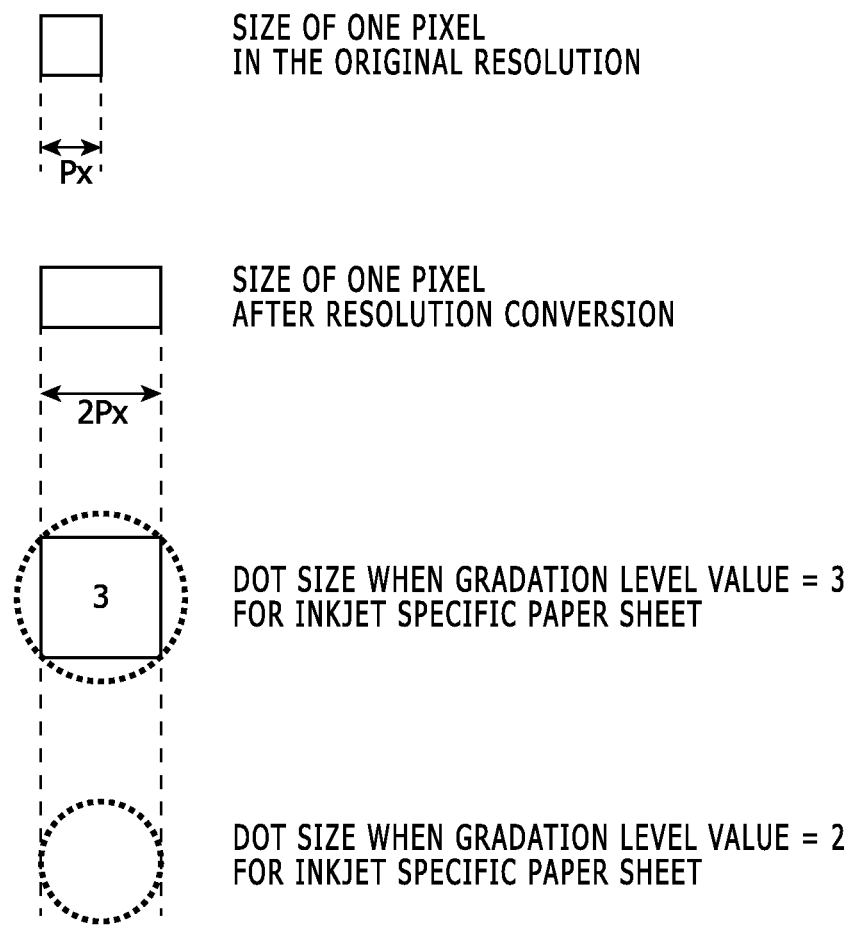
FIG. 5 shows a diagram that explains a dot size for an inkjet specific paper sheet.
Figure 7:
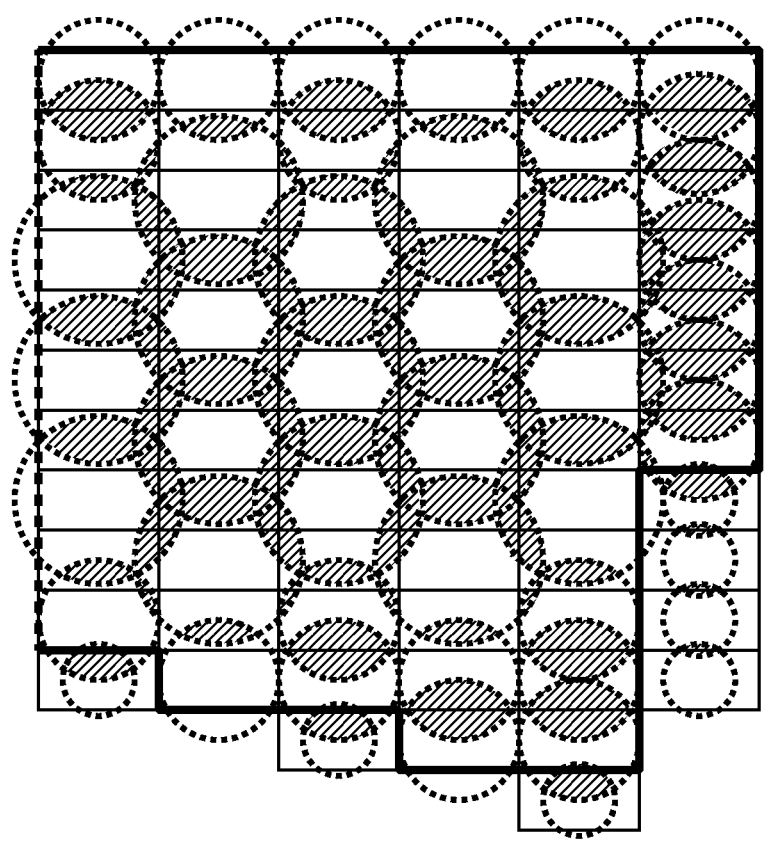
FIG. 7 shows a diagram that indicates an example of a dot sequence in a solid part after pixel value conversion performed by an output value converting unit 13 shown in FIG. 1 for an inkjet specific paper sheet.
Figure 8:
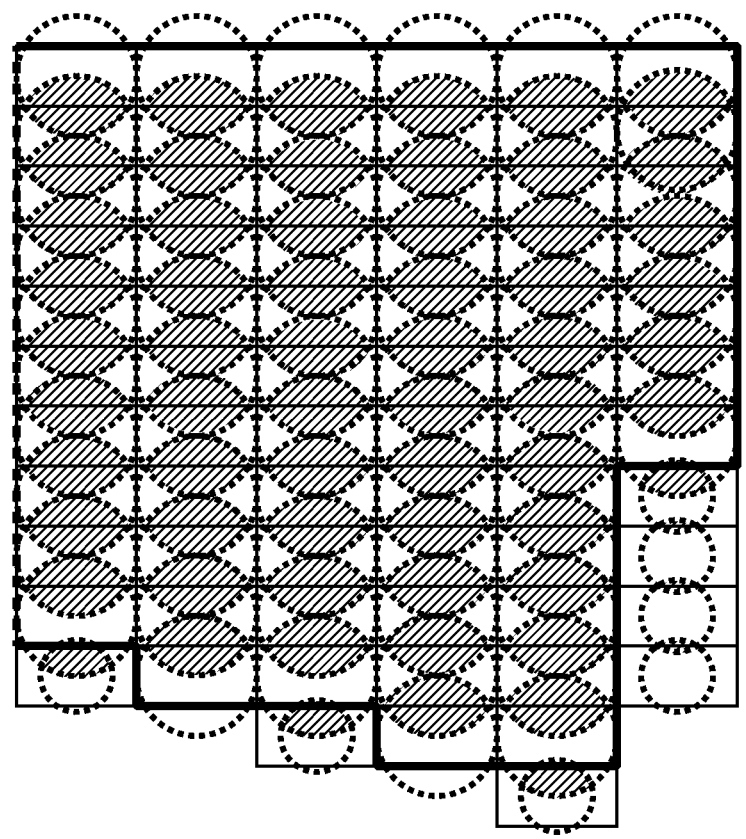
FIG. 8 shows a diagram that indicates an example of a dot sequence in a solid part before pixel value conversion performed by an output value converting unit 13 shown in FIG. 1 for an inkjet specific paper sheet.

FIG. 5 shows a diagram that explains a dot size for an inkjet specific paper sheet. FIGS. 6A and 6B show diagrams that indicate an example of conversion of a pixel value in a solid part performed by the output value converting unit 13 shown in FIG. 1 for an inkjet specific paper sheet. FIG. 7 shows a diagram that indicates an example of a dot sequence in a solid part after pixel value conversion performed by the output value converting unit 13 shown in FIG. 1 for an inkjet specific paper sheet. FIG. 8 shows a diagram that indicates an example of a dot sequence in a solid part before pixel value conversion performed by the output value converting unit 13 shown in FIG. 1 for an inkjet specific paper sheet.

If the printing device 3 is an inkjet printing device and the sheet type information indicates "inkjet specific paper sheet", then a liquid ink amount of an ejected droplet is controlled so as to form a dot with a dot size shown in FIG. 5. If the resolution in the primary scanning direction after the resolution conversion is 600 dpi and the resolution in the secondary scanning direction is 1200 dpi, then for the pixel value of 3 (i.e. the maximum value), a liquid ink amount of an ejected droplet is controlled so as to cause the dot size (i.e. a diameter of the dot) to agree with a diagonal length of one-pixel area at 600 dpi. A larger dot size is set for less ink blur of a sheet type indicated by the sheet type information. An inkjet specific paper sheet produces little ink blur and therefore a relatively large dot size is set for the inkjet specific paper sheet.

Further, for an image after the resolution conversion process such as shown in FIG. 6A, the dot deletion and the dot size gain are performed by the output converting unit 13 as shown in FIG. 6B on the basis of the patterns shown in FIGS. 3A and 3B. If this dot deletion and this dot size gain are performed, the dot sequence shown in FIG. 7 appears. Contrarily, if this dot deletion and this dot size gain are not performed, the dot sequence shown in FIG. 8 appears. Thus, the dot deletion and the dot size gain are performed alternately, and consequently, the density of the solid part is maintained, and an improper line, banding and the like are restrained.

Figure 11:
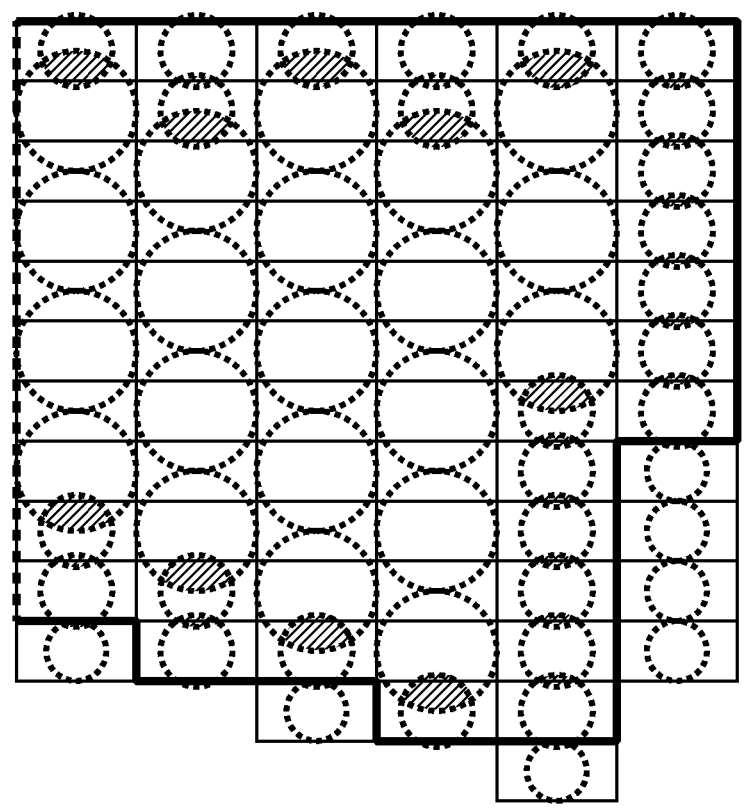
FIG. 11 shows a diagram that indicates an example of a dot sequence in a solid part after pixel value conversion performed by an output value converting unit 13 shown in FIG. 1 for a plain paper sheet.
Figure 12:
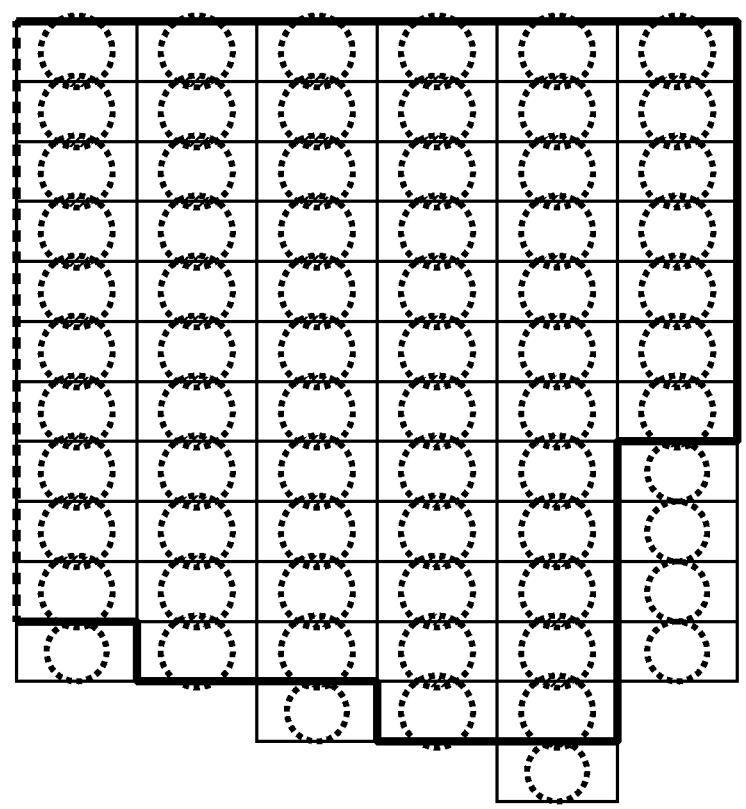
FIG. 12 shows a diagram that indicates an example of a dot sequence in a solid part before pixel value conversion performed by an output value converting unit 13 shown in FIG. 1 for a plain paper sheet.

FIG. 9 shows a diagram that explains a dot size for a plain paper sheet. FIGS. 10A and 10B show diagrams that indicate an example of conversion of a pixel value in a solid part performed by the output value converting unit 13 shown in FIG. 1 for a plain paper sheet. FIG. 11 shows a diagram that indicates an example of a dot sequence in a solid part after pixel value conversion performed by the output value converting unit 13 shown in FIG. 1 for a plain paper sheet. FIG. 12 shows a diagram that indicates an example of a dot sequence in a solid part before pixel value conversion performed by the output value converting unit 13 shown in FIG. 1 for a plain paper sheet.

If the printing device 3 is an inkjet printing device and the sheet type information indicates "plain paper sheet", then a liquid ink amount of an ejected droplet is controlled so as to form a dot with a dot size shown in FIG. 9. If the resolution in the primary scanning direction after the resolution conversion is 600 dpi and the resolution in the secondary scanning direction is 1200 dpi, then for the pixel value of 3 (i.e. the maximum value), a liquid ink amount of an ejected droplet is controlled so as to cause the dot size (i.e. a diameter of the dot) to agree with one side length of one-pixel area at 600 dpi. A plain paper sheet produces much ink blur and therefore a relatively small dot size is set for the plain paper sheet. In general, in an inkjet printing device, a liquid surface at a tip of a head nozzle sometimes gets unstable after a droplet is ejected with the maximum liquid ink amount corresponding to the maximum pixel value. However, as shown in FIGS. 7 and 11, a dot next to a dot formed with the maximum liquid ink amount is deleted and thereby long time elapses until a next droplet ejection and in such long time the liquid surface gets stable. Therefore, the printing device 3 is capable of properly controlling a liquid ink amount of a droplet even after ejecting a droplet with the maximum liquid ink amount.

Further, for an image after the resolution conversion process such as shown in FIG. 10A, the dot deletion and the dot size gain are performed by the output converting unit 13 as shown in FIG. 10B on the basis of the patterns shown in FIGS. 4A and 4B. If this dot deletion and this dot size gain are performed, the dot sequence shown in FIG. 11 appears. Contrarily, if this dot deletion and this dot size gain are not performed, the dot sequence shown in FIG. 12 appears. Thus, the dot deletion and the dot size gain are performed alternately, and consequently, the density of the solid part is maintained, and an improper line, banding and the like are restrained. In addition, for a plain paper sheet, a relatively small dot size is set due to relatively much ink blur, and therefore, in an edge part of the solid part, dots to be deleted are decreased and dots of which dot sizes are to be gained are increased, and thereby the density of the solid part is maintained.

As mentioned, in this embodiment, the output value converting unit 13 (a) changes pixel values of pixels alternatively determined in a primary scanning direction and a secondary scanning direction so as to delete a dot on the pixels in a solid part in a target image and (b) changes pixel values of pixels that are alternatively not determined in the primary scanning direction and the secondary scanning direction so as to gain a dot size of the pixels in the solid part. The controller 2 controls the printing device 3 so as to cause the printing device 3 to print the solid part with a dot size corresponding to the pixel value.

Consequently, a dot size is gained of a pixel adjacent to a pixel on which a dot was deleted and therefore the pixel on which a dot was deleted is covered by the dot of the adjacent pixel. Therefore, the density of the solid part is properly maintained and banding is restrained.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a printing device;
   a processor; said processor capable of running software programs;
   an output value converting unit, running on the processor; configured to (a) change pixel values of pixels alternatively determined in a primary scanning direction and a secondary scanning direction so as to delete a dot on the pixels in a solid part in a target image and (b) change pixel values of pixels that are alternatively not determined in the primary scanning direction and the secondary scanning direction so as to gain a dot size of the pixels in the solid part; and
   a controller configured to control the printing device so as to print the solid part with dot sizes corresponding to the pixel values;
   wherein a resolution of the target image in the primary scanning direction and a resolution of the target image in the secondary scanning direction are different from each other; and
   the output converting unit gains the dot size of the pixels alternately not determined to be a dot size in a case assuming that the both resolutions in the primary and secondary scanning directions would be identical to a lower resolution in one of the primary and secondary scanning directions than a resolution in the other of the primary and secondary scanning directions.

2. The image forming apparatus according to claim 1, wherein the output value converting unit changes a ratio between the pixels on which dots are deleted and the pixels of which a dot size is gained in an edge part of the solid part in accordance with a sheet type.

3. The image forming apparatus according to claim 2, wherein the output value converting unit determines, by performing pattern matching, the pixels on which dots are deleted and the pixels of which a dot size is gained.

4. The image forming apparatus according to claim 1, further comprising a resolution converting unit configured to change two pixels to one pixel in one of the primary and secondary scanning directions in an original image of which resolutions in the primary and the secondary scanning directions are identical to each other and thereby generate the target image.

5. The image forming apparatus according to claim 4, wherein the original image is an image after a screen process.

* * * * *